United States Patent [19]

Cornell

[11] 3,765,447

[45] Oct. 16, 1973

[54] METERING VALVE FOR REGULATING THE FLOW OF CONTAMINATED FLUIDS

[75] Inventor: Richard Henry Cornell, Marblehead, Mass.

[73] Assignee: General Electric Company,

[22] Filed: Dec. 20, 1971

[21] Appl. No.: 209,693

[52] U.S. Cl.............. 137/538, 137/537, 137/541, 137/543.21
[51] Int. Cl............................................ F16k 15/02
[58] Field of Search.................. 138/46; 137/513.3, 137/513.5, 513.7, 535, 536, 538, 540, 543.21, 494; 251/175, 205, 193

[56] References Cited
UNITED STATES PATENTS

| 1,074,199 | 9/1913 | Poland | 251/193 |
| 1,128,077 | 2/1915 | Taylor | 137/538 X |
| 2,085,982 | 7/1937 | Johnson | 137/538 |
| 2,700,394 | 1/1955 | Jay | 137/118 |
| 2,896,662 | 7/1959 | Thomas | 137/538 |
| 2,934,085 | 4/1960 | Mylander | 251/175 X |
| 2,991,972 | 7/1961 | Busby | 251/175 |
| 3,080,885 | 3/1963 | Webster et al | 137/538 X |

Primary Examiner—Robert G. Nilson
Attorney—Edward S. Roman et al.

[57] ABSTRACT

A flow metering valve for regulating the flow of fluids contaminated with particulate matter includes a valve housing with a translatable valve member disposed within the housing and space apart from the interior walls of the housing by guide means which minimize the contacting areas of the moving surfaces, substantially reducing the risk of particulate matter being drawn therebetween and seizing the moving parts. Metering ports are unevenly arranged around the housing such that the flow of pressurized fluid through the housing operates to load the valve member into tight engagement with the areas immediately surrounding the metering ports so as to provide substantially zero clearance therebetween, and further aid in prohibiting the intrusion of contaminants between the moving surfaces.

8 Claims, 8 Drawing Figures

PATENTED OCT 16 1973  3,765,447
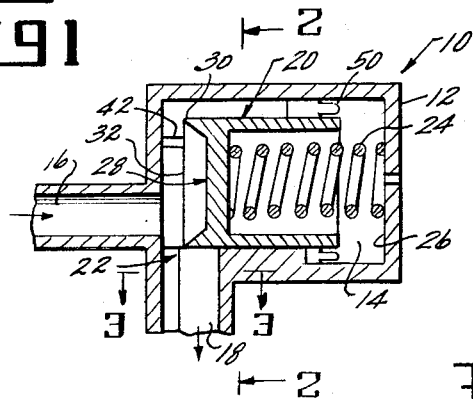
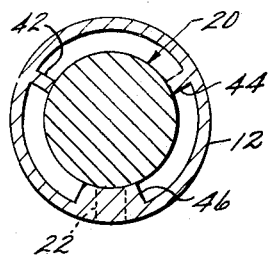
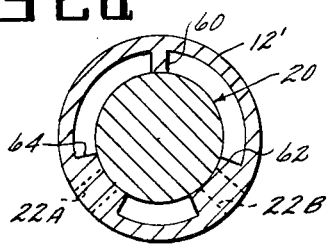
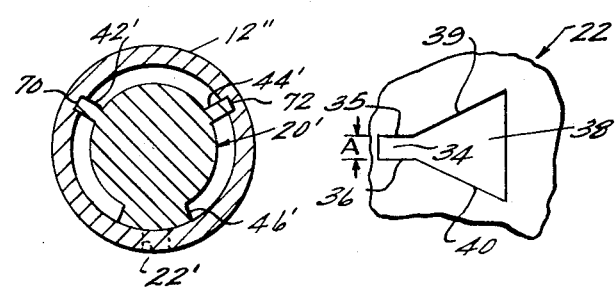
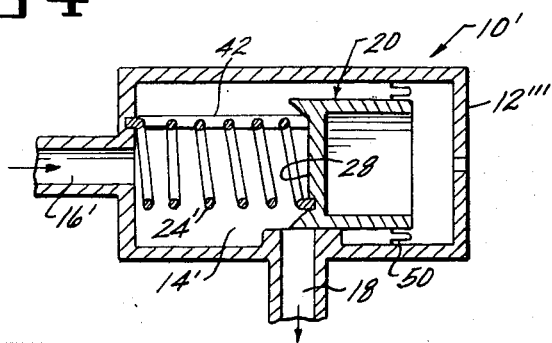
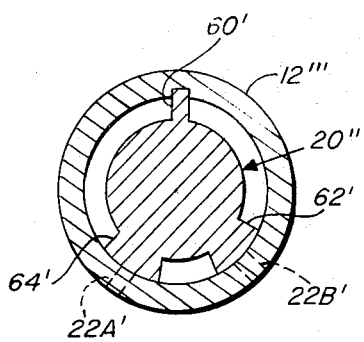
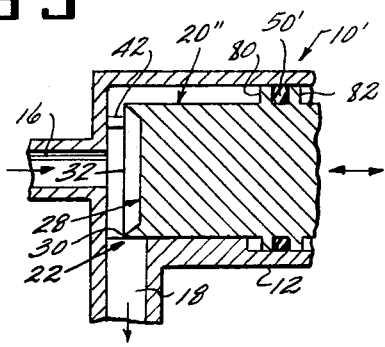
INVENTOR.
RICHARD H. CORNELL
BY Edward R. Roman
ATTORNEY

METERING VALVE FOR REGULATING THE FLOW OF CONTAMINATED FLUIDS

BACKGROUND OF THE INVENTION

This invention relates to a flow metering valve for operation with fluids contaminated with particulate matter and more particularly to a flow metering valve for continuous operation with contaminated fluids wherein the moving surfaces of the metering valve are maintained free of particulate matter without the addition of a complex wash fluid means for cleansing the moving surfaces.

The invention herein described was made in the course of or under a contract or subcontract thereunder, (or grant) with the Department of the Army.

One application for a fuel metering valve may include utilization within a gas turbine engine to accurately meter prescribed amounts of fuel to each of several nozzles which disperse the fuel within a combustion chamber for burning. Fuel may be metered by flowing fuel through a chamber such that the output flow is directed through a metering port, the area of which may be adjusted. A simple, yet highly effective, metering orifice may be formed by two opposing walls, wherein one of the walls contains a hole or window of predetermined size and the other wall is adapted to slide over the surface immediately surrounding the hole, cooperating therewith to form a metering port. The metering port may be fully opened by sliding one of the walls into full offset relation with the opposing wall, or alternatively the metering port may be fully closed by sliding the walls into overlapping relation so as to block the flow of fluid therethrough.

In a working fuel distribution system for gas turbine engines, the fuel is generally contaminated by undesirable particulate matter. These contaminants are drawn between the moving walls of the fuel metering valve causing sticking and seizure of such members. Seizure and wear could be prevented by highly filtering all of the fuel undergoing distribution; however, this would prevent high flow rates since a filter small enough to remove the smallest contaminants would also impose a high pressure drop upon the system.

An alternate solution which has been practised in the art involves diverting a portion of fuel from the main flow path at a point upstream of the metering valve. The diverted fuel is then finely filtered to serve as a wash fluid whereupon it is introduced between the slidable walls of the metering port. The finely filtered wash fuel cleanses the area intermediate the moving surfaces preventing sticking or seizure of the moving parts.

The disadvantages to a finely filtered wash fuel system relate to the added complexity of what would otherwise be a simple metering valve. Additional hardware in the nature of very fine filters together with conduits for diverting the wash fuel all contribute to increase both the weight and complexity of the metering valve with a corresponding decrease in reliability.

Therefore, it is an object of this invention to provide a metering valve for regulating the flow of fluid contaminated by particulate matter, wherein the moving surfaces of the valve are protected against sticking and seizure without diverting and finely filtering a portion of the main flow for use as a wash fluid.

It is also an object of this invention to provide a simplified metering valve for regulating the flow of fluid contaminated by particulate matter wherein the arrangement of the sliding valve member within the valve housing is sufficient, in and of itself, to prevent particulate matter from drifting between the moving surfaces.

SUMMARY OF THE INVENTION

A flow metering valve includes a valve housing having a chamber therein, together with inlet means for directing fluid into the valve chamber and outlet means disposed asymmetrically around the valve housing for directing fluid out of the valve chamber. A translatable valve member is included within the valve chamber and spaced apart from the walls of the valve chamber. Guide means are interposed between the valve member and valve chamber to support the valve member in spaced apart relation to the valve chamber. Flow through the valve chamber is varied by translation of the valve member within the valve chamber and the asymmetric arrangement of the valve means accommodates loading of the valve member against the area immediately surrounding the outlet means.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a cross-sectional view of the flow metering valve of this invention.

FIG. 2a, 2b, 2c, and 2d are cross-sectional views across the line 2—2 of FIG. 1 showing alternate arrangements for the flow metering valve of this invention.

FIG. 3 is a cross-sectional view across the line 3—3 of FIG. 1.

FIG. 4 is a cross-sectional view of an alternate embodiment of the flow metering valve of this invention.

FIG. 5 is a cross-sectional view of another alternate embodiment of the flow metering valve of this invention.

DESCRIPTION OF THE PREFERRED EMBODIMENT

Referring now to the drawing and particularly to FIG. 1, there is shown generally at 10 a flow control or flow metering valve including a valve housing 12 defining a chamber 14 therein. The valve housing 12 includes an inlet opening 16 for receiving an inflow of fuel and an outlet opening 18 for discharging fuel from the valve housing 12. A movable valve member shown generally at 20 is retained for longitudinal translation within the valve housing 12. As may be readily observed from FIG. 2a, the valve housing generally assumes the shape of a cylinder, and the movable valve member 20 generally assumes the shape of a piston which is axially translatable within the cylindrical housing. It should be understood, however, that the intended scope of invention is not limited to a circular cross-sectional configuration and that the valve and housing could alternatively be curvilinear or recilinear in cross-section.

The valve housing 12 includes an outlet metering port 22 through the bottom portion thereof and the slidable valve member covers the metering port when in the closed position. A compression spring 24 seats within the hollow valve member piston 20 and engages a wall 26 of the valve chamber so as to urge the valve member 20 to the closed position. The valve member head shown generally at 28 may include a beveled circumferential flange 30 around the periphery thereof, wherein the flange 30 is made integral to the valve member piston 20. Translation of the edge 32 of flange 30 over the metering port 22 determines the exact rate of fuel flow through the flow metering valve 10.

Referring now to FIG. 3 for greater detail of the outlet metering port 22 it can be seen that the port includes a neck portion 34 with initial parallel sides 35, 36 and an adjacent portion 38 with diverging sides 39, 40. The metering port herein described is conventional and although preferred for the purposes of this invention, it is by no means an essential requirement and other metering port configurations could alternatively be utilized.

As is readily apparent from FIG. 1 and FIG. 2a, the diameter of the valve member piston 20 is made smaller than the diameter of the valve chamber housing 12. As best seen in FIG. 2a, the valve housing 12 is maintained concentric to the valve member piston 20 by three circumferentially spaced, axial guides 42, 44 and 46 which are formed integral to the valve housing 12, and project radially inward into the valve chamber 14 so as to intimately engage the axially extending side surface of the valve member piston 20 and maintain the valve member piston for axial sliding motion within the valve housing. The axial guides 42, 44 and 46 are preferably spaced apart at equal arcuate distances thereby evenly distributing the loading forces on each guide. The bottom guide 46 extends a greater circumferential distance than the remaining guides 42, 44 so as to accommodate the metering port 22 which extends therethrough. An annular dynamic seal means 50 circumferentially extends around the valve member piston 20 and provides for sealing engagement between the outside surface of the valve member piston 20 and the inside surface of the valve housing chamber 14. The annular seal 50 is referred to as a dynamic seal because it rolls upon axial translation of the outside surface of the valve member piston 20 and is, therefore, generally referred to as a rolling diaphragm.

In operation, the metering valve 10 may serve either as a pressurizing valve, a relief valve, or a bypass pressure drop regulating valve. For application as a fuel metering valve in a gas turbine engine, unfiltered fuel or fuel which has previously been filtered through a somewhat coarse filter to filter out particles that might otherwise clog the valve inlet and outlet passages is directed under pressure to the inlet port 16 of the valve housing. The fuel enters the valve chamber 14 whereupon, due to the normal closed position of the metering valve piston 20, the outlet flow of fuel becomes restricted. The pressure of the restricted fuel within the chamber 14 eventually increases to compress the spring 24 axially translating the piston toward the open position.

As previously discussed, particulate matter dispersed within the fuel tends to lodge between the moving surfaces of the valve eventually jamming the valve movement. The problem has been found to be particularly acute in the areas immediately surrounding the metering ports where a portion of the high velocity flow of pressurized fuel creeps between the moving surfaces depositing contaminants therebetween, and eventually causing the moving parts to seize. Previous methods for preventing this type of jamming in valve mechanisms which meter contaminated fluids involved intricate schemes whereby a portion of the metered fluid had to be diverted and highly filtered. Then the highly filtered wash fluid was redirected back between the moving surfaces to wash away contaminants which may have lodged therebetween. The metering flow valve of this invention, however, eliminates the necessity of providing a separate wash fluid by first minimizing the area of contact between the moving surfaces, thereby reducing the likelihood of particulate matter lodging therebetween. Second, only a single metering port is included which operates to provide a substantially zero clearance between the valve member piston and housing in the area of the metering port, thereby inhibiting dispersion of contaminants between the valve member piston and housing in this area.

The circumferential width of the guides 42 and 44 is minimized so as to present as little contacting surface between the guides and piston as is practically feasible without tending to score the surface of the valve piston. Also, once the fuel fills the valve chamber the areas about which the guides 42, 44 contact the metering valve piston 20 tend to be quiescent areas of flow, with the main flow and high relative flow velocities being generally confined to the area directly between the inlet 16 and outlet 18. The fact that the flow in the areas about which the guides 42, 44 contact the metering piston 20 tends to be quiescent substantially reduces the possibility of particles drifting between the moving valve surfaces.

The circumferential width of the bottom guide cannot be made less than the width of the metering port 22 which it accommodates. Also, due to the high relative flow velocities of the fuel passing through the metering port 22, this becomes the area most likely to jam due to contaminants drifting between the moving parts. However, including only one metering port within the housing operates to upset the radial balance of the metering valve piston during valve operation so that the valve piston becomes hydraulically loaded against the metering port 22 and its associated guide 46. This hydraulic loading provides for substantially zero clearance between the moving surfaces immediately surrounding the metering port and substantially reduces the tendency for contaminants and particulate matter to be drawn in around the metering port as in the case of a multiport, balanced piston type of conventional metering valve. The beveled circumferential flange 30 acts to provide an improved pressure recovery on the head of the piston. The hydraulic loading does precipitate an increase in the frictional drag forces between the valve piston and housing; however, the spring force and actuating area of the piston head 28 may be determined independent of the metering port area and allow for sufficiently high actuating forces so as to present no difficulty in overcoming the increased frictional drag. As should be readily obvious, the radial extent of the guides 42, 44 and 46 must be sufficient to accommodate the largest contaminant particles. The dynamic seal 50 prevents pressurized fuel from leaking past the valve member piston thereby preserving the integrity of the metering mechanism.

It is preferred that the valve should never completely close. Also, the width A of the neck portion 34 of the metering port 22 should not be less than twice the width of the largest expected contaminant particle so as to reduce the possibility of the metering valve clogging before opening. The slopes of the divergent sides 39, 40 of the metering port are preferably maintained at less than 30° to the valve axis whereas 30° has been generally found to be the maximum angle which will still prevent contaminants from lodging between the valve member piston and the edge of the metering port as the piston closes. The shallow slope allows the contaminants to be pushed aside by the closing piston.

Although the single metering port as previously described is preferred, it is possible to include more than one metering port and have a satisfactorily operating valve without special provisions for inclusion of a wash fluid to cleanse between the moving surfaces. Referring now to FIG. 2b, there is shown an alternate arrangement wherein first and second metering ports 22A, 22B, of the type previously described and shown in FIG. 3 pass through guides 64 and 62 respectively. Guide 60 is a supporting member provided to maintain concentricity between the valve member piston 20 and valve housing 12'. As should be readily obvious, the inflow of pressurized fuel to the valve chamber and through the metering ports operates to radially unbalance the piston in the manner previously described. The valve piston member 20 becomes hydraulically loaded against the guides 62, 64 so as to again provide a substantially zero clearance between the moving parts. The resulting valve friction for this arrangement however is less than that of FIG. 2a assuming identical flow rates and pressure differentials and further assuming that the combined areas of the two metering ports equal the area of the single port of FIG. 2a. As becomes immediately obvious, the mechanism common to both FIG. 2a and FIG. 2b, which makes possible continued operation of the metering valve without provision for a wash fluid, relates directly to the unbalanced or uneven arrangement of the metering ports. It can be seen that even more than two metering ports could be included provided they were maintained in an asymmetric or uneven arrangement around the valve member piston surface. However, as the number of metering ports increases, then the contacting surface areas between moving parts correspondingly increases with an increasing risk that contaminants will lodge therebetween and jam the moving parts.

Although the guides have been previously described as being integral with the interior walls of the valve chamber 14, it is also possible to form the guides integral with the valve member piston as shown in FIG. 2c. Here guides 42', 44', and 46' are formed integral with the valve piston 20' and the metering port 22' communicates only through the valve housing 12" so as to accommodate translation of guide 46' thereover. When the guides are formed integral with the valve member piston, anti-rotation means must be provided to prevent the guide 46' from rotating out of registration with the metering port 22'. Anti-rotation means may be provided in the form of axially extending grooves 70, 72 in the valve housing which engage the ends of the guides 42' and 44' respectively. Alternatively, anti-rotation may be provided by some other arrangement such as a guide pin (not shown).

It is also possible to provide more than one metering port where the guides are formed integral with the valve member piston as shown in FIG.2d wherein first and second metering ports 22A', 22B' of the type previously described and shown in FIG. 2c communicate only through the valve housing 12''' so as to accommodate respective translation of guides 64', 62' thereover.

Referring now to FIG. 4, where like numerals refer to previously described elements, thereis shown an alternate arrangement by which a tension spring 24' may be connected between the valve housing 12''' and valve member piston 20 such that expansion of the spring 24' operates to open the valve. FIG. 5 shows an alternate arrangement whereby the spring 24 is eliminated entirely, and the piston is longitudinally translated by means such as a solenoid or actuator which are not shown. There is also shown an alternate arrangement for the dynamic seal 50 whereby a conventional annular O ring seal 50' is maintained for sliding motion relative to the valve housing by interposition between two axially spaced and radially extending integral flange members 80, 82.

Although the invention has been escribed in relation to a fuel flow metering valve as included in a gas turbine engine, it is readily understood to have broader application to any flow metering valve subjected to a contaminated flow.

It is to be further understood that axially spaced, circumferential grooves (not shown) of the type well known to the art may be included in either the outside surface of the valve member piston or the inside surface of the valve housing in order to dislodge and remove contaminant particles in the unlikely event that such particles should jam between the moving surfaces.

Having thus described one embodiment of the invention, what is desired to be secured by letters patent is as follows:

1. A flow metering valve comprises:
    a valve housing having a chamber therein, together with inlet means through the valve housing for directing fluid into the valve chamber and unevenly arranged outlet means through the valve housing for directing fluid out of the valve chamber;
    a valve member disposed for translation within the valve chamber in continuous spaced apart relation from the walls of the chamber wherein the valve member includes a head portion tansverse to the axis of the valve translation and the outlet means are unevently disposed around the axis of valve member translation;
    guide means interposed between the valve member and the walls of the valve chamber to support the valve member in translatable spaced apart relation to the walls of the valve chamber, wherein the guide means are formed integral to the valve housing and the outlet means communicates through the valve housing and guide means with an opening into the valve chamber which is adjacent the valve member such that translation of the valve member over the opening regulates the rate of fluid flow therethrough, and the the uneven arrangement of the outlet means, upon the introduction of an inlet flow, operates to upset the balance of the valve member along its axis of translation such that the valve member becomes loaded in the direction of the outlet means providing substantially zero clearance between the moving surfaces immediately adjacent the outlet means, and substantially reducing the tendency for contaminants and particulate matter to be drawn in around the outlet means.

2. The flow metering valve of claim 1 wherein:
    the outlet means are unevenly arranged around the valve housing such that the flow of pressurized fluid through the housing operates to urge the valve member into intimate engagement with those guide means through which the outlet means communicates, establishing substantially zero clearance therebetween so as to inhibit the intrusion of particulate matter between the moving surfaces of the valve member and guide means.

3. The flow metering valve of claim 1 wherein:

the valve housing is of a hollow cylindrical shape;

the valve member assumes the general shape of a piston for translation along the axis of the housing;

the guide means include axial members which extend radially inward from the interior of the valve housing chamber and engage the valve piston so as to maintain concentricity between the valve housing and valve piston;

means are included for axially urging the valve member over the opening of the outlet means;

the inlet means are arranged to axially direct the fluid against the head of the valve piston so as to urge the valve piston in the axial direction opposing the urging means thereby controlling the flow through the valve;

the outlet means are unevenly distributed around the valve housing such that the flow of pressurized fluid through the housing further operates to upset the radial balance of the valve piston, hydraulically loading it against those guide means through which the outlet means communicates establishing substantially zero clearance therebetween so as to inhibit the intrusion of particulate matter between the moving surfaces of the valve piston and guide members; and the valve piston further includes an axially extending flange around the periphery of the valve head together with a seal disposed between the piston and valve housing to prevent escape of the fluid through other than the outlet means.

4. The flow metering valve of claim 1 wherein the outlet means includes at least two outlet ports.

5. A flow metering valve comprises:

a valve housing having a chamber therein, together with inlet means through the valve housing for directing fluid into the valve chamber and outlet means through the valve housing for directing fluid out of the valve chamber;

a valve member disposed for translation within the valve chamber in continuous spaced apart relation from the walls of the valve chamber wherein the valve member includes a head portion transverse to the axis of valve translation and the outlet means are unevenly disposed around the axis of valve member translation;

guide means interposed between the valve member and the walls of the valve chamber to support the valve member in translatable spaced apart relation to the walls of the valve chamber, wherein the guide means are formed integral to the valve member and the outlet means communicates through the valve housing with an opening into the valve chamber which is adjacent the guide means such that translation of the valve member and its associated integral guide means over the opening regulates the rate of fluid flow therethrough, and the uneven arrangement of the outlet means, upon the introduction of an inlet flow, operates to upset the balance of the valve member along its axis of translation such that the valve member becomes loaded in the direction of the outlet means providing substantially zero clearance between the moving surfaces immediately adjacent the outlet means, and substantially reducing the tendency for contaminants and particulate matter to be drawn in around the outlet means.

6. The flow metering valve of claim 5 wherein the outlet means are unevenly arranged around the valve housing such that the flow of pressurized fluid through the housing operates to urge the associated integral guide means of the valve member into intimate engagement with the areas immediate to the openings of the outlet means establishing substantially zero clearance therebetween so as to inhibit the intrusion of particulate matter between the moving surfaces of the valve member and guide means.

7. The flow metering valve of claim 5 wherein:

the valve housing is of a hollow cylindrical shape;

the valve member assumes the general shape of a piston for translation alon the axis of the housing;

the guide means include axial members which extend radially outward from the outside surface of the valve piston and engage the interior of the valve housing chamber so as to maintain concentricity between the valve housing and valve member;

means are included for axially urging the valve member and its associated integral guide means over the opening of the outlet means;

the inlet means are arranged to axially direct the fluid against the head of the valve piston so as to ruge the valve piston and its associated integral guide means in the axial direction opposing the urging means thereby controlling the flow through the valve;

the outlet means are unevenly distributed around the valve housing such that the flow of pressurized fluid through the housing further operates to upset the radial balance of the valve piston, hydraulically loading the guide members against the respective openings of the outlet means establishing substantially zero clearance therebetween so as to inhibit the intrusion of particulate matter between the moving surfaces of the guide members and valve housing;

the valve piston further includes an axially extending flange around the periphery of the valve head, and anti-rotational means are provided to inhibit rotation of the valve piston and its associated integral guide means within the cylindrical housing together with a seal disposed between the piston and valve housing to prevent escape of the fluid through other than the outlet means.

8. The flow metering valve of claim 5 wherein the outlet means includes at least two outlet ports.

* * * * *